US012037198B2

(12) United States Patent
Larsen et al.

(10) Patent No.: US 12,037,198 B2
(45) Date of Patent: Jul. 16, 2024

(54) REVERSE VENDING MACHINE TRANSPORT DEVICE

(71) Applicant: RVM Systems AS, Drammen (NO)

(72) Inventors: Gudmund Larsen, Drammen (NO); Frode Tollefsen Bryhn, Spikkestad (NO); Terje Leslie Mostue, Borgen (NO); Lars Helge Stølen, Sandefjord (NO)

(73) Assignee: RVM Systems AS, Drammen (NO)

( * ) Notice: Subject to any disclaimer, the term of this patent is extended or adjusted under 35 U.S.C. 154(b) by 107 days.

(21) Appl. No.: 17/759,409

(22) PCT Filed: Jan. 27, 2020

(86) PCT No.: PCT/EP2020/051930
§ 371 (c)(1),
(2) Date: Jul. 25, 2022

(87) PCT Pub. No.: WO2021/151465
PCT Pub. Date: Aug. 5, 2021

(65) Prior Publication Data
US 2023/0048854 A1 Feb. 16, 2023

(51) Int. Cl.
*B65G 15/14* (2006.01)
*B65G 39/16* (2006.01)
(Continued)

(52) U.S. Cl.
CPC ............. *B65G 15/14* (2013.01); *B65G 39/16* (2013.01); *B65G 47/57* (2013.01); *G07F 7/0609* (2013.01);
(Continued)

(58) Field of Classification Search
CPC ........ B65G 15/14; B65G 39/16; B65G 47/57; B65G 2201/0252; G07F 7/0609
(Continued)

(56) References Cited

U.S. PATENT DOCUMENTS 3,612,249 A * 10/1971 Schneider .............. B65G 37/00
271/902
3,768,625 A 10/1973 Schneider
(Continued)

FOREIGN PATENT DOCUMENTS

DE 102008038003 A1 2/2010

OTHER PUBLICATIONS

International Search Report issued in International Application No. PCT/EP2020/051930, mailed Oct. 30, 2020 (4 pages).
(Continued)

*Primary Examiner* — Douglas A Hess
(74) *Attorney, Agent, or Firm* — Osha Bergman Watanabe & Burton LLP

(57) ABSTRACT

A reverse vending machine includes a transport device for lifting an object in the reverse vending machine. The transport device includes a conveyor device for lifting the object from a lower level position to a higher level position in the reverse vending machine, and an object supporting device. The object supporting device is arranged substantially parallel to the conveyor device and arranged in such a way as to allow the object to be held between the conveyor device and the object supporting device during the lifting of the object.

16 Claims, 11 Drawing Sheets

(51) Int. Cl.
*B65G 47/57* (2006.01)
*G07F 7/06* (2006.01)

(52) U.S. Cl.
CPC ............... *B65G 2201/0244* (2013.01); *B65G 2201/0252* (2013.01)

(58) Field of Classification Search
USPC .................................. 198/586, 626.1, 626.2
See application file for complete search history.

(56) References Cited

U.S. PATENT DOCUMENTS

| | | | | |
|---|---|---|---|---|
| 3,799,323 A * | 3/1974 | Schneider | ............... | B07C 3/087 198/367 |
| 4,248,389 A | 2/1981 | Thompson et al. | | |
| 4,784,251 A * | 11/1988 | DeWoolfson | ......... | G07F 7/0609 194/212 |
| 4,936,441 A * | 6/1990 | Akesaka | ................ | B65G 15/14 198/806 |
| 5,161,661 A * | 11/1992 | Hammond | ............ | G07F 7/0609 209/583 |
| 5,361,913 A * | 11/1994 | Melchionna | .......... | G07F 7/0609 209/583 |
| 5,461,972 A | 10/1995 | Tahkanen | | |
| 5,988,054 A * | 11/1999 | Wieglus | .................... | B09B 3/20 198/363 |
| 6,012,588 A * | 1/2000 | Steidel | ................. | B65G 11/203 209/939 |
| 8,069,968 B2 * | 12/2011 | Zimmermann | ........ | B65H 29/58 198/369.2 |
| 8,851,265 B2 * | 10/2014 | Morishita | ................ | B28B 3/02 194/208 |
| 9,139,368 B2 * | 9/2015 | Viilo | ....................... | B02C 21/02 |
| 9,399,555 B2 * | 7/2016 | Fonnelop | .................. | G07F 7/06 |
| 11,708,220 B2 * | 7/2023 | Elder | ..................... | B65G 15/16 198/626.2 |
| 2015/0206373 A1 * | 7/2015 | Kim et al. | | |

OTHER PUBLICATIONS

Written Opinion issued in International Application No. PCT/EP2020/051930; Dated Oct. 30, 2020 (6 pages).

* cited by examiner

REVERSE VENDING MACHINE TRANSPORT DEVICE

FIELD OF THE INVENTION

The present invention relates in general to transporting objects from a lower position to a higher position. More particularly, the invention relates to a transport device for lifting an object from a lower level position to a higher level position in a in a reverse vending machine. The invention also relates to a reverse vending machine which includes such a transport device.

BACKGROUND

Reverse vending machines (RVMs) for recycling of returnable containers have been on the market for many years. The RVMs accept empty objects such as containers, verify the authenticity of the object and issue a receipt or other confirmation that can be exchanged for cash or used as payment. The RVMs sort and separate objects of different materials to facilitate utilization of the raw material at a later stage in the recycling process. Usually the plastic and metal containers are compacted to reduce waste volume, glass is either transported whole or crushed. In the future, RVMs can also be used to collect/return other objects such as batteries, light bulbs, cups and food containers which are causing littering and or are an important resource as recycled material.

The logistic chain for transporting returned containers deposited in the RVMs have a range of different containers for this. The containers (pallet frames, bags, cardboard boxes, wire mesh containers, etc.) holding the returned bottles, cans and similar have various dimensions. Consequently, there is a need for mechanisms which can sort, process and transport the objects in various heights and directions in a space efficient way.

For every link in the logistic chain it is important to utilize the available space in the best possible way. There is usually limited floor space available where the RVMs are placed, the cost per square meter is high and it will usually give more profit to use the space to sell merchandise. Obviously, a larger number of returned objects can be stored in a tall container, trolley or pallet. All stages of the logistics chain which includes collection, sorting, transport, storage and processing benefits from using the full height of the available space.

In a machine operated by human beings the natural height for entering objects onto a conveyor belt or in an opening is typically 900-1400 mm above floor level. The objects are initially fed and transported one by one, either manually or by a motorized movement. The height of 900-1400 mm gives a very poor utilization of the space and especially the volume of the storage bins which in most cases must be below or at a lower level than the conveyor or input opening. The current invention will enable a compact and space efficient RVM where sorting and vertical transport is combined in to one device and makes storage bins with heights between 1 to 3 meters and above feasible without making the footprint of the complete installation excessively large.

Therefore, a transport device in a reverse vending machine must have a compact design allowing for vertical or steep angled transportation of the returned objects. Hence, there is a need for a transport device for lifting an object from a lower level position to a higher level position in a in a reverse vending machine. There is also a need for such a transport device that operates in a quick, reliable and efficient manner.

SUMMARY OF THE INVENTION

The invention relates to a transport device for lifting an object in a reverse vending machine, as has been set forth in the appended, independent claim 1. The invention also relates to a reverse vending machine that includes such a transport device.

Advantageous embodiments, features or aspects have been defined in the dependent claims.

BRIEF DESCRIPTION OF THE DRAWINGS

It should also be understood that the following figures are merely illustrative and may not be drawn to scale.

DETAILED DESCRIPTION OF THE INVENTION

Figure 1:
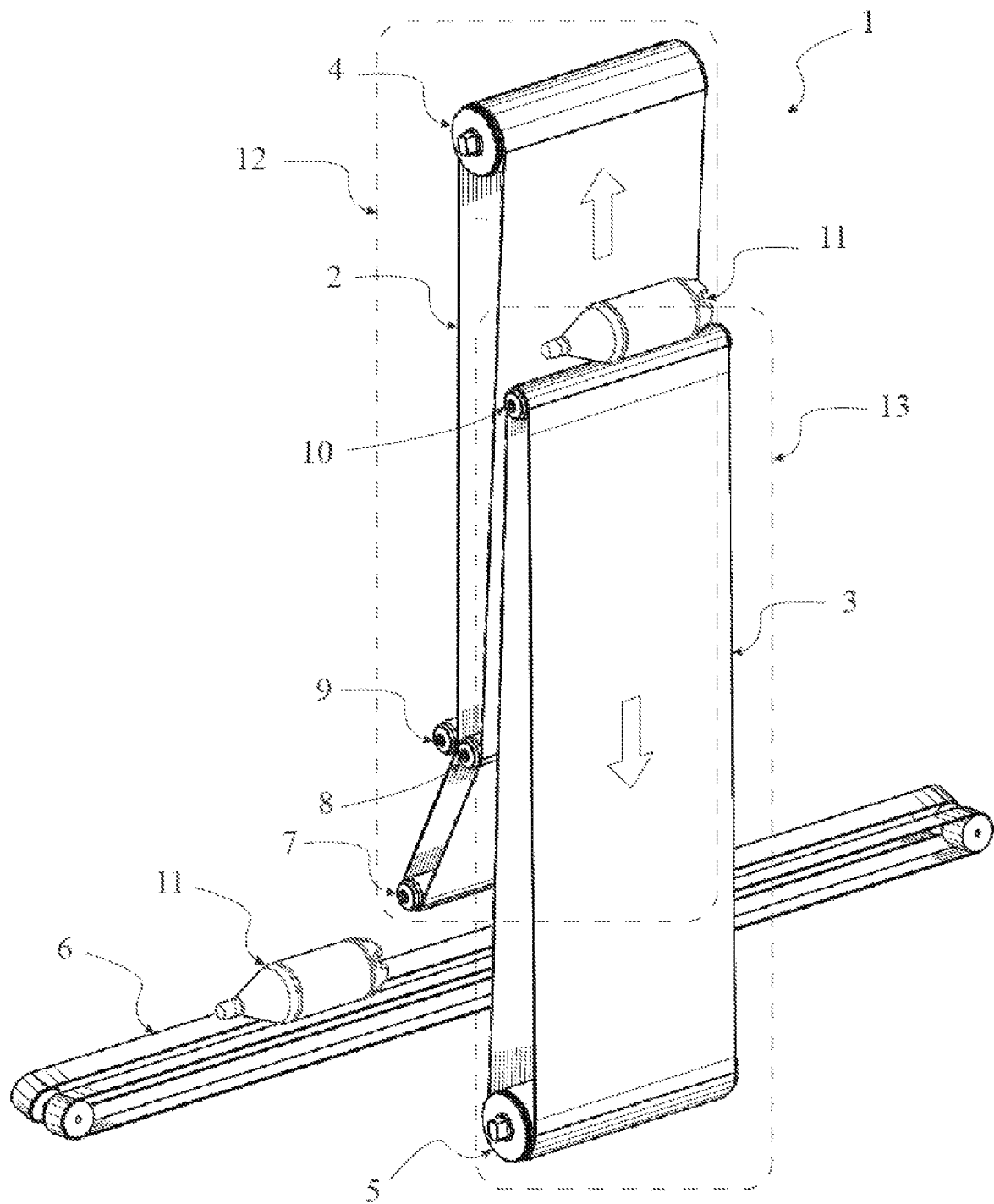
FIG. 1 is a perspective view of the primary embodiment of a transport device.

The following detailed description of this embodiment is merely exemplary in nature and is not intended to limit the invention or the application and use of the invention. Furthermore, there is no intention to be bound by any expressed or implied theory presented in the preceding technical field, background, or the following detailed description. Corresponding reference numerals are used throughout the drawings for identical or corresponding elements.

FIG. 1 is a perspective view of the primary embodiment of a transport device 1 for lifting an object, for instance containers, such as bottles and cans, in a reverse vending machine. The transport device 1 is usually incorporated in a reverse vending machine for receiving objects 11.

In the context of the present disclosure, objects may typically refer to returnable containers such as bottles and cans. However, objects may also refer to cartons, pouches, beverage containers, food containers and other items like bottles or cans, cups, light bulbs, batteries, etc.

In many typical applications, the objects 11 are partly or substantially cylindrical, or at least rotational symmetric. However, the objects do not have to be rotational symmetric. Alternatively, they can be shaped as triangular prisms, rectangular prisms, pyramids, spheres, cones or almost any shape, this fact just adds to the complexity of handling all the different sizes and shapes of objects. Typically, when the objects 11 are substantially rotational symmetric, the objects will have a largest diameter of 40 to 15 mm and a height of 40 to 40 mm.

The transport device 1 comprises a conveyor device 13 and a corresponding object supporting device 12 which, during operation, grab and transport objects 11 of various or equal shape and size from a lower level position to a higher level position in the reverse vending machine. The transport device can be used for sorting of various objects, by grabbing and then moving objects 11 from a lower position, for instance on a translational conveyor 6, to a higher position via the conveyor device 13 and the object supporting device 12, while allowing other objects 11 to be transported past the conveyor device 13 and the object supporting device 12 on the translational conveyor 6. The objects 11 that are selected to continue along the translational conveyor 6 can move on to another transport, sorting, processing, and/or storage device.

Figure 5:
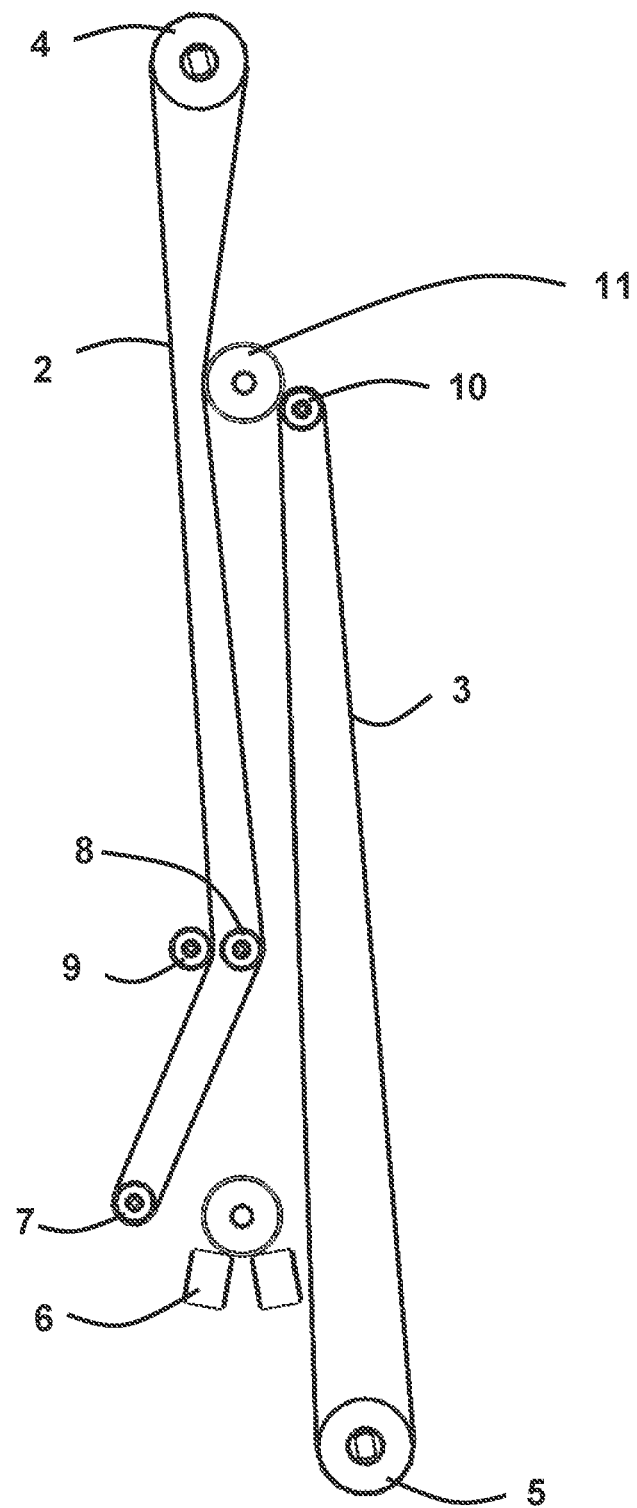
FIG. 5 is a front view of the primary embodiment of a transport device in a fourth operational state.
Figure 6:
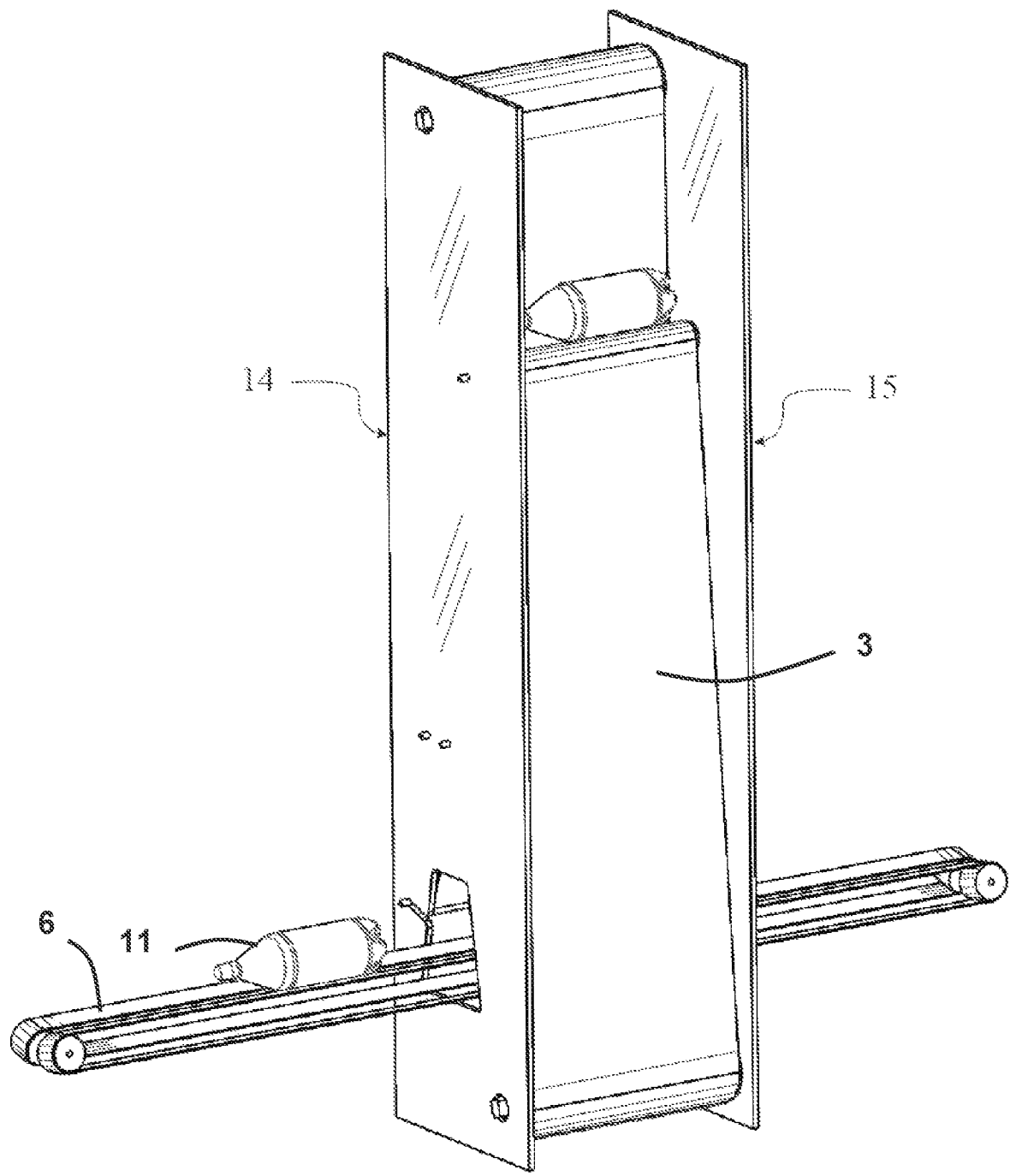
FIG. 6 is a perspective view of the primary embodiment of a transport device with side walls included.
Figure 7:
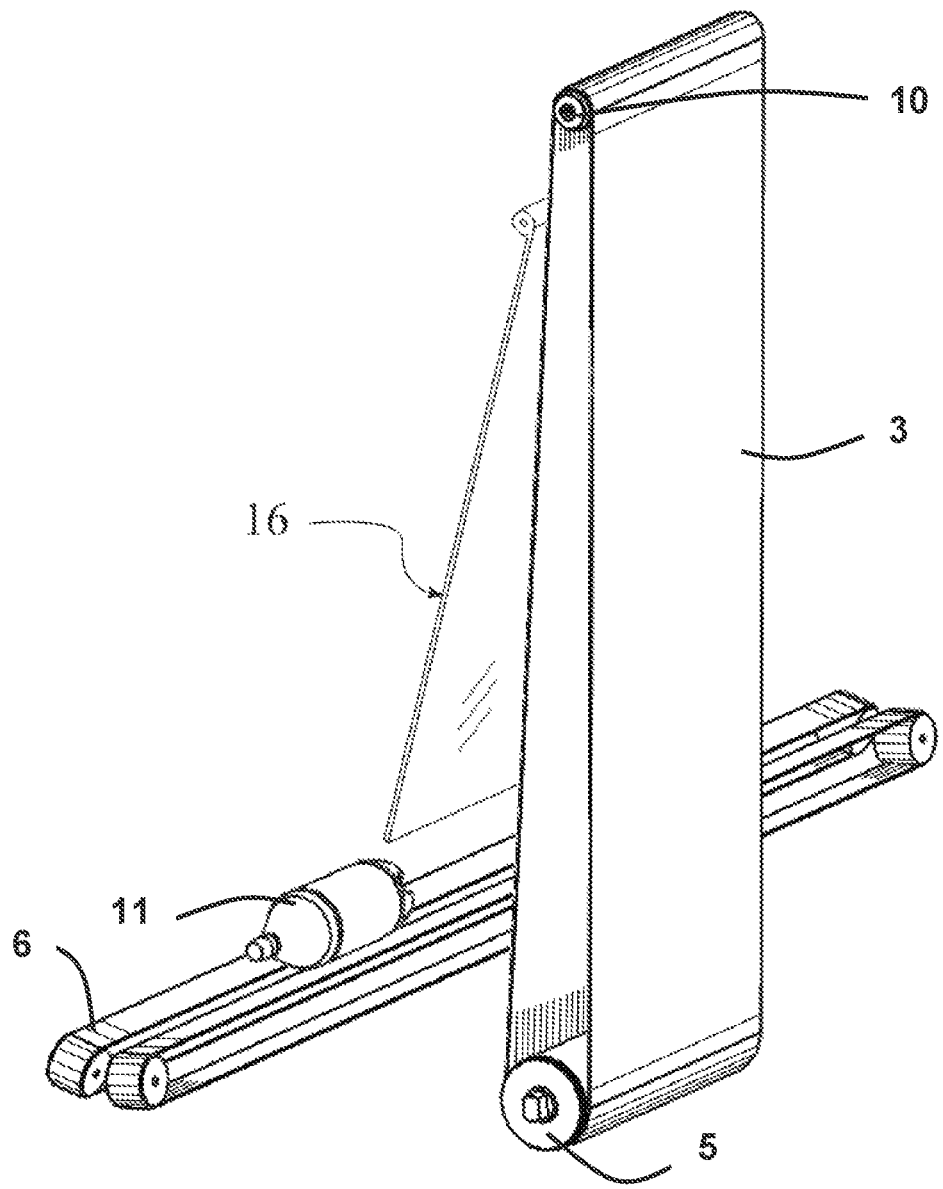
FIG. 7 is a perspective view of an alternate embodiment of a transport device.

The object supporting device 12 may be embodied either as a conveyor belt-based object supporting device, as shown in the primary embodiment of FIGS. 1-6 and 8-10, or alternatively as a clamping member-based object supporting device, as shown in the alternate embodiment of FIG. 7. Other alternatives for the object support device also exist.

A translational conveyor 6 may advantageously be part of the transport device 1. The translational conveyor 6 is arranged to transport the object 11, usually in a substantially horizontal direction, from a feeding location (not shown) to an entry location of the conveyor device 13 and the object supporting device 12.

The translational conveyor 6 may have a V-shaped upper surface, as illustrated. Alternatively, it may have a U-shaped, gutter-like, round, substantially flat or flat upper surface. In the illustrated embodiment, a horizontal translational conveyor 6 consisting of two conveyor belts placed in a 160° V-shape is used.

The translational conveyor 6 may transport the objects at a certain speed forward, where the objects 11 are placed in a row, one object at a time. In FIG. 1, the translational conveyor 6 will under normal, forward operation transport the object 11, shown as a bottle, with its bottom first.

The speed of the translational conveyor can typically be between 0.1-2.5 m/s, which corresponds roughly to 20-100 objects/min. The distance between the objects 11 will vary due to the feeding of the objects, which may often be performed manually by a user. When the object 11 has reached a certain position, it will either be grabbed and elevated to a higher location, or the object can continue along the translational conveyor 6. The translational conveyor may have different lengths and dimensions.

In some configurations, the translational conveyor 6 may be arranged to be lifted or moved towards the entry location of the conveyor device 13 and the object supporting device 12.

Further possible features and aspects of the translational conveyor 6 have been disclosed below with reference to FIG. 11.

The transport device 1 comprises a conveyor device 13 for conveying the object 11 from a lower level position to a higher level position in the reverse vending machine.

The transport device 1 also comprises a object supporting device 12 for conveying the object 11 from the lower level position to the higher level position in the reverse vending machine. The conveyor device 13 and the object supporting device 12 are arranged in a substantially parallel manner, in such a way that the object 11 is allowed to be held between the conveyor device 13 and the object supporting device 12 during operation, and in particular during the lifting of the object 11. The conveyor device and the object supporting device may advantageously be arranged with a space between them.

The conveyor device 13 and the object supporting device 12 may advantageously be arranged vertically, or substantially vertically, or at any desired angle upwards, i.e., they may be vertically inclined. In the illustrated exemplary embodiment, the lifting conveyor is approximately 90° relatively to the horizontal plane of the translational conveyor 6, but it can be arranged with an angle in the range 10° to 170°, or in the range 45° to 135°, or in the range 60° to 120°.

The conveyor device 13 and the object supporting device 12 may have different lengths and can be positioned in different angles and heights. In the illustrated exemplary embodiment, the width of the conveyor belts is equal to the longest object that is transported, and the belts are designed essentially flat.

As illustrated, each of the conveyor device 13 and the object supporting device 12 includes one endless conveyor belt. Alternatively, one or both of the conveyor device 13 and the object supporting device 12 may include two or more belt segments.

In the embodiment illustrated in FIG. 1, the conveyor device 13 includes a first, endless conveyor belt 3 arranged about a first drive roller 5 and a first support roller 10.

Advantageously the first drive roller 5 and the first support roller 10 are rotatable around fixed, parallel axes.

Advantageously, the first drive roller 5 includes a motor which is arranged to rotate the first drive roller in such a direction that the first conveyor belt 3 forces the object 11 to be lifted.

Various types of motors may be used for the first drive roller 5. The motor may typically be an electric motor with or without a gearbox. The motor could alternatively be pneumatic, hydraulic, piezoelectric or another type of motor. As a detailed example, the motor may be an electric, geared drum roll motor.

The first conveyor belt 3 is advantageously elastic in its longitudinal direction. Further possible features and aspects of the first conveyor belt has been disclosed later in this detailed description.

In the embodiment illustrated in FIG. 1, the object supporting device 12 includes a second, endless conveyor belt 2 arranged about a second drive roller 4 and a second support roller 7. During the lifting of the object, the object is held between the first conveyor belt 2 and the second conveyor belt 3.

Advantageously, the second drive roller 4 includes a motor, arranged to rotate the second drive roller in such a direction that the second conveyor belt 2 forces the object 11 to be lifted. In this case the object supporting device 12 may also act as an active element in the lifting of the object 11.

Various types of motors may be used for the second drive roller 4. The motor may typically be an electric motor with or without a gearbox. The motor could alternatively be pneumatic, hydraulic, piezoelectric or another type of motor. As a detailed example, the motor may be an electric, geared drum roll motor.

Advantageously, the second conveyor belt 6 is elastic at least in its longitudinal direction. Further possible features and aspects of the second conveyor belt has been disclosed later in this detailed description.

Further, in the embodiment illustrated in FIG. 1, the object supporting device 12 includes an intermediate support roller 8. The second drive roller 4 and the intermediate support roller 8 are rotatable around fixed, parallel axes, while the second support roller 7 is rotatable about a moveable axis which is also parallel with the axes of the second drive roller 4 and the intermediate support roller 8.

In FIG. 1, the second support roller 7 has been illustrated in an "out" position, in which the second support roller 7 is prepared to either let an object 11 continue through on the translational conveyor 6 or sort the object 11 by entering the object 11 into the lower area of the conveyor device 13 and the object supporting device 12. This has been further elaborated below with reference to FIG. 2.

Although not shown in FIG. 1, the transport device 1 may further comprise an actuating device which is arranged to move the moveable axis of the second support roller 7 in such a way that a spacing between first conveyor belt 3 and the second conveyor belt 2 will be reduced until an object 11 which is selected to be sorted comes in contact with the first 3 and the second 2 conveyor belts. Then the object 11 is clamped between the moving conveyor belts 3 and 2, and the clamping force will create friction forces that together with the moving conveyor belts will move the object upward. This enables the transport device 1 to function as a sorting device. The actuator device may be an electric, pneumatic, hydraulic, piezoelectric or other type of motor, linear actuator or force-feeding device. This performs the sorting action and is activated by a control device. The control device can be a PC, PLC, embedded control board, micro controller or microprocessor with a suitable software computer program.

The second support roller 7 can be moved between two or more static positions by means of the above-mentioned actuating device. Advantageously, there are two positions, defined as the positions "in" and "out".

When an object 11 arrives at the translational conveyor 6, or another flat surface, it will move at a certain speed. When the object 11 is in the desired position directly alongside the second support roller 7, the second support roller 7 will move from position "out" to position "in". The object is then removed from its position on the translational conveyor 6 and pushed by the second support roller 7 towards the first conveyor belt 3. This has been further elaborated below with reference to FIG. 3.

In an alternative embodiment, both the second support roller 7 and a similar arrangement of a movable support roller on the lifting conveyor 13 could create the same effect, specifically to reduce the spacing or distance between conveyor belts 3 and 2 by moving both conveyor belts towards each other. It can also be envisioned a solution where both conveyor belts 3 and 2 are hinged at the top and that the lower end can be moved towards the object 11 in order to make contact, clamp and transport the object 11 upwards.

When the second support roller 7 is in state "in", the object 11 will be in contact with both the first conveyor belt 3 and the second conveyor belt 2. Since the conveyor belts 2, 3 are moving upward during normal operation of the transport device 1, the object 11 will also move upwards by the friction and clamping force between the belts 2, 3. When the object 11 has moved upwards above or past the intermediate support roller 8, the second support roller 7 will return to its state/position "out". This has been further elaborated below with reference to FIG. 4. In state "out" objects which shall not be sorted into the conveyor device 13 and the object supporting device 12 can pass through.

The second support roller 7 will then be ready to push the next object while at the same time the conveyor device 13 and the object supporting device 12 are lifting the previous object 11. The second support roller 7 is controlled by the control device so that it pushes selected objects only.

As illustrated, a side support roller 9 may be arranged in parallel with and next to the intermediate support roller 8, with the conveyor belt arranged between the intermediate support roller 8 and the side support roller 9. The side support roller is arranged in such a way as to guide and tighten the second conveyor belt 2 so that the clamping force is maintained as the object 11 is transported upwards.

The first support roller 10, the second support roller 7, the intermediate support roller 8 and the side support roller 9 may, by example, have a diameter of 50 mm and a length of 428 mm. These dimensions may be adapted to the dimensions of the conveyor belts. Advantageously, all the support rollers are identical, in both design and function.

The first drive roller 5 and the second drive roller 4, which include respective motors for driving the conveyor belts, may typically have the same length as the support rollers 7, 8, 9, 10. The drive rollers 4, 5 may advantageously have a larger diameter than the diameter of the support rollers, for instance 100 mm.

In the illustrated exemplary embodiment, the first drive roller 5 has been located in the bottom position of the conveyor device 13, while the second drive roller 4 has been located in the top position of the object supporting device 12. However, the first drive roller 5 may alternatively be located in the top position of the conveyor device 13. Also, the second drive roller 4 may alternatively be located in the bottom position of the object supporting device 12.

The objects 11 may vary with different materials, weight, surface friction and other properties. Sufficient elasticity in the conveyor belts 2, 3 is an advantage so that the effective clamping force causes limited or no deformation and damage to the objects 11 during their transportation, while maintaining reliable transportation. Elasticity of the belts is particularly advantageous in the belts' longitudinal direction. The belts may advantageously be made of rubber.

As an alternative a spring-loaded tensioning mechanism can be used to maintain proper tension to achieve this functionality.

The surface of the conveyor belts facing towards the object 11 can have some texture, ribs or any type of finish or material which provides a suitable friction towards the objects. This is to ensure that the objects are reliably transported and moved in the correct direction during transport.

Advantageously, the speed of the conveyor belts is predominantly equal during operation. The speed may, e.g. typically be 1 m/s, but can vary from 0.2-2.5 m/s. The conveyor device 13 and possibly the object supporting device 12 have been shown as including one endless conveyor belt, but each of them can also be built from two or more conveyor belt segments or conveyor belts. In the primary embodiment, as illustrated in FIG. 1, the width of each conveyor belt 3, 2 is the same as or wider than the longest object intended to be used with the transport device 1.

In an exemplary embodiment the dimensions of the conveyor belts are width=400 mm and the thickness=2 mm. The width of each conveyor belt can also be smaller than the length of the objects, and other thickness can be used. Length and position on the belts will vary according to circumstances.

Figure 2:
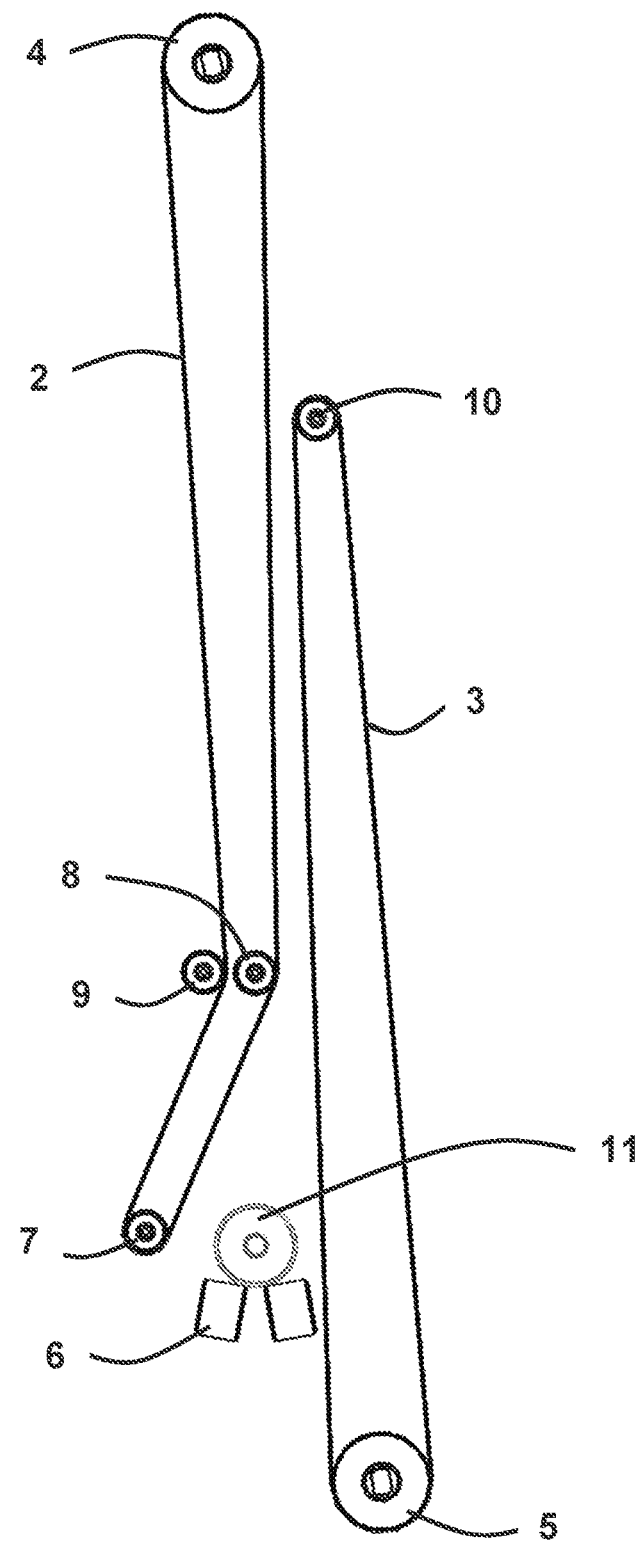
FIG. 2 is a front view of the primary embodiment of a transport device in a first operational state.

FIG. 2 is a front view of the primary embodiment of a transport device in a first operational state.

The first operational state corresponds to the situation explained above with reference to FIG. 1. In the first operational state, the second support roller 7 is in position "out", i.e., it is prepared to either let objects continue through on the translational conveyor 6 or sort the objects into the conveyor device 13 and the object supporting device 12.

Figure 3:
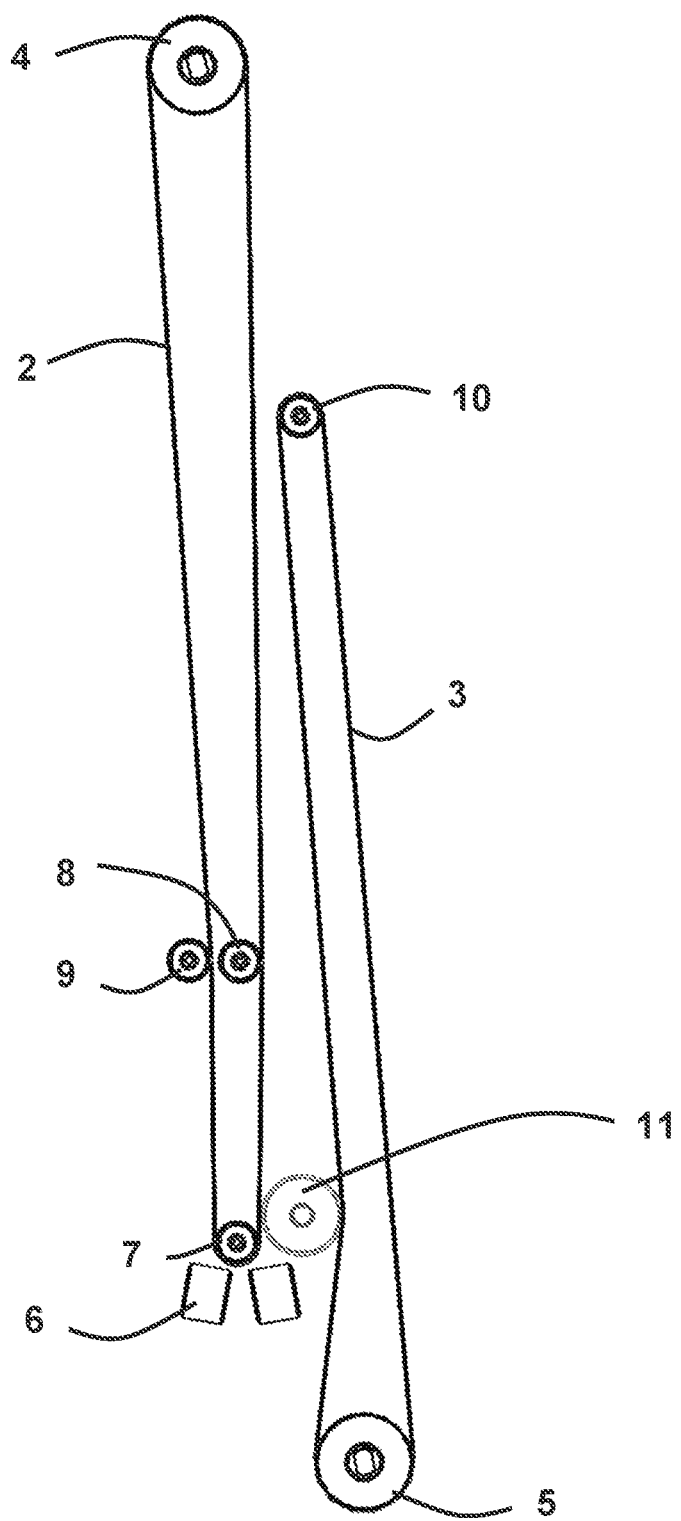
FIG. 3 is a front view of the primary embodiment of a transport device in a second operational state.

FIG. 3 is a front view of the primary embodiment of a transport device in a second operational state.

In the second operational state, the second support roller 7 is in position "in", i.e., the object 11 has been selected for sorting into the conveyor device 13 and the object supporting device 12. Otherwise the position and state of the various elements of the transport device 1 correspond to their position and state in the first operational state.

Figure 4:
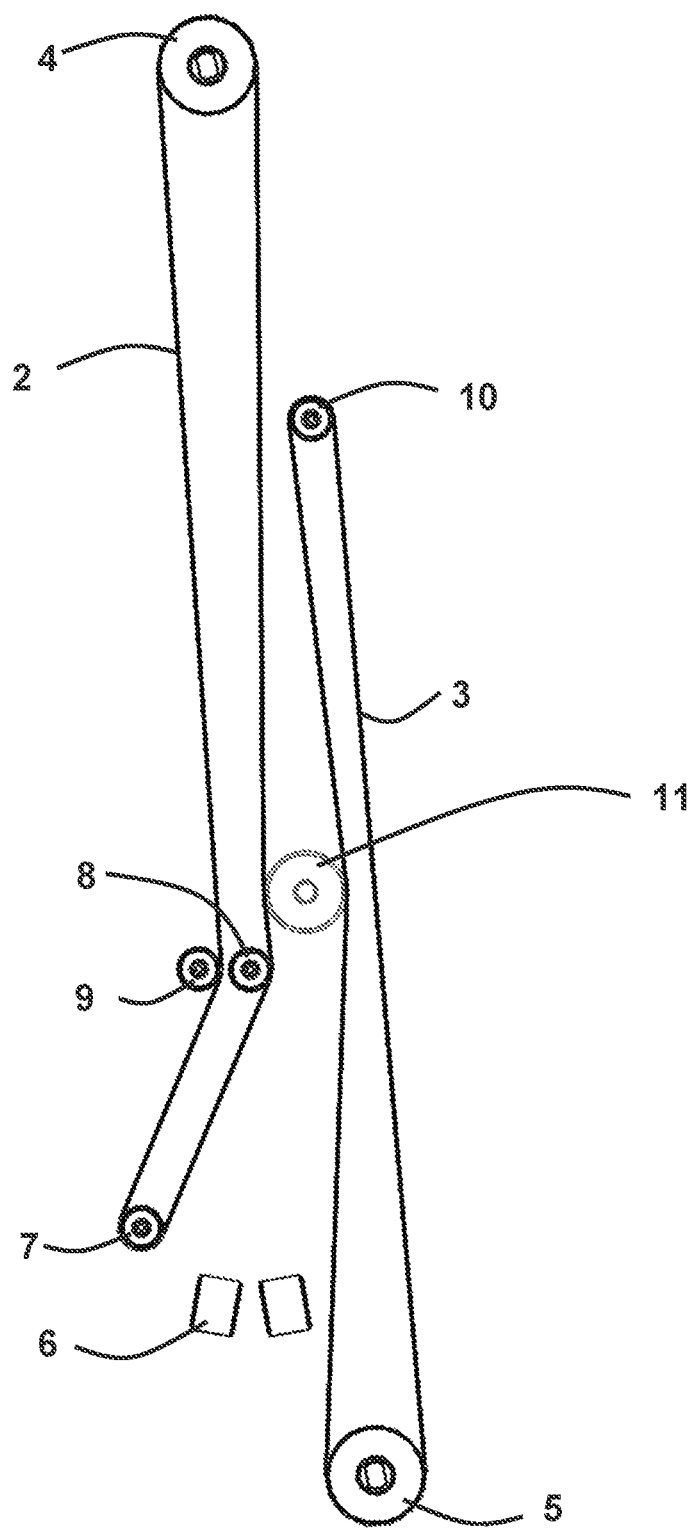
FIG. 4 is a front view of the primary embodiment of a transport device in a third operational state.

FIG. 4 is a front view of the primary embodiment of a transport device in a third operational state.

In the third operational state, the second support roller 7 has been returned to its position "out", and the object 11 is being lifted by means of the first and the second conveying devices. Otherwise, in the third operational state, the position and state of the various elements of the transport device 1 correspond to their position and state in the second operational state.

FIG. 5 is a front view of the primary embodiment of a transport device in a fourth operational state.

In the fourth operational state, the object 11 is about to exit the conveying device and a new object is entering on the translational conveyor 6.

When the object 11 is exiting the conveying devices at the top, it may be rolling, falling or sliding further to a trolley, pallet, compactor or other device. The object could also be further conveyed to other locations. In this embodiment the object exits the conveyor device 13 and the object supporting device 12 in one specific direction, but this could be any direction. Passive or active guiding elements could send the object in selected direction(s). This has been further elaborated below with reference to FIG. 8.

Otherwise, in the fourth operational state, the position and state of the various elements of the transport device 1 correspond to their position and state in the third operational state.

FIG. 6 is a perspective view of the primary embodiment of a transport device with side walls 14, 15 included.

Each side wall has an opening in which the translational conveyor 6 extends through. The opening in each side wall is made large enough to allow objects 11 to pass through.

The support rollers and drive rollers may have axles or shafts that may be supported at suitable positions at the side walls 14, 15, advantageously by means of rotary bearings. The side walls 14, 15 will ensure that the objects cannot fall out to the sides during transportation within the transport device 1.

FIG. 7 is a perspective view of an alternate embodiment of a transport device.

In the embodiment illustrated in FIG. 7, the object supporting device 12 does not include a conveyor belt and rollers. Instead, the second conveyor device 12 includes a clamping member 16 which has a surface, e.g. a plain surface facing the first conveyor belt 3.

During the lifting of the object 11, the object 11 is clamped between the conveyor device 13 and the surface of the clamping member 16 which is facing the first conveyor belt 3.

To this end, the transport device may further comprise an actuating device (not shown) which is arranged to move the clamping member 16 in such a way that a spacing between first conveyor belt and the surface of the clamping member 16 will be reduced until an object 11 which is selected to be lifted, comes in contact with the first conveyor belt 3 and the clamping member 16. Then the object 11 is clamped between the conveyor belt 13 and the clamping member 16 and then transported upwards.

The actuating device may e.g. include an electromagnetic, pneumatic or hydraulic actuator, e.g. a linear actuator. When the object 11 has exited, the clamping member 16 is arranged to be moved back to the open position, by the actuating device, to allow the next object to continue through on the translational conveyor 6 or move into position so clamping member 16 can push it toward the conveyor device 13.

As shown in FIG. 7, the clamping member 16 may have a substantially rectangular shape. The clamping member 16 may be hinged at its upper edge or consist of two separate parts where the lower part is hinged at its upper edge and an upper part is fixed and essentially parallel to the conveyor device 13. This will achieve a function corresponding to that of the conveyor-belt based object supporting device 12 shown in FIGS. 1-6 and 8-10.

Figure 8:
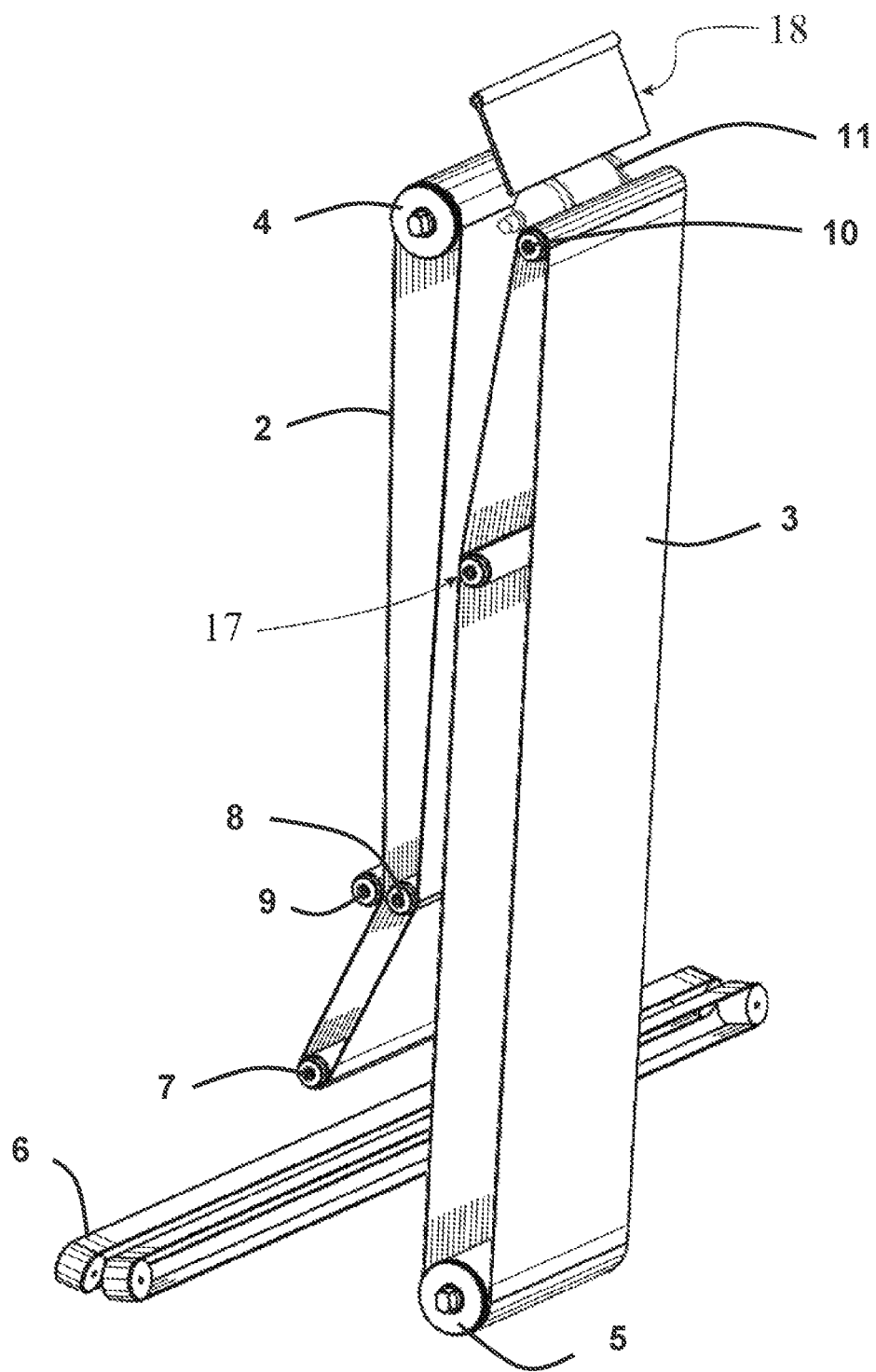
FIG. 8 is a perspective view of the primary embodiment of a transport device with additional exit guiding means.

FIG. 8 is a perspective view of the primary embodiment of a transport device with additional exit guiding means.

In the embodiment illustrated in FIG. 8, the transport device further comprises a top sorter flap 18 which is arranged to guide an object 11, when it exits the conveyor device 13 and/or the object supporting device 12, in one of a plurality of directions.

As shown in FIG. 8, the top sorter flap 18 may have a substantially rectangular shape. The top sorter flap 18 may be hinged at its upper edge. The arrangement which allows the top sorter flap to guide an object may include an actuating device (not shown) which changes the position of the top sorter flap 18. The actuating device may e.g. include an electromagnetic, pneumatic or hydraulic actuator.

In some cases, in particular depending on the length of the conveyor belts, there might be need for an additional support roller 17 to maintain the clamping force along the entire extension of the first conveyor belt 3. This has been illustrated in FIG. 8. During operation it may be necessary for minimum one of the upper support or drive rollers to be spring loaded, either by a separate spring mechanism or by utilizing the tension of the conveyor belt. This contributes to maintaining an adequate clamping force while at the same time allowing the objects to pass the rollers.

Figure 9:
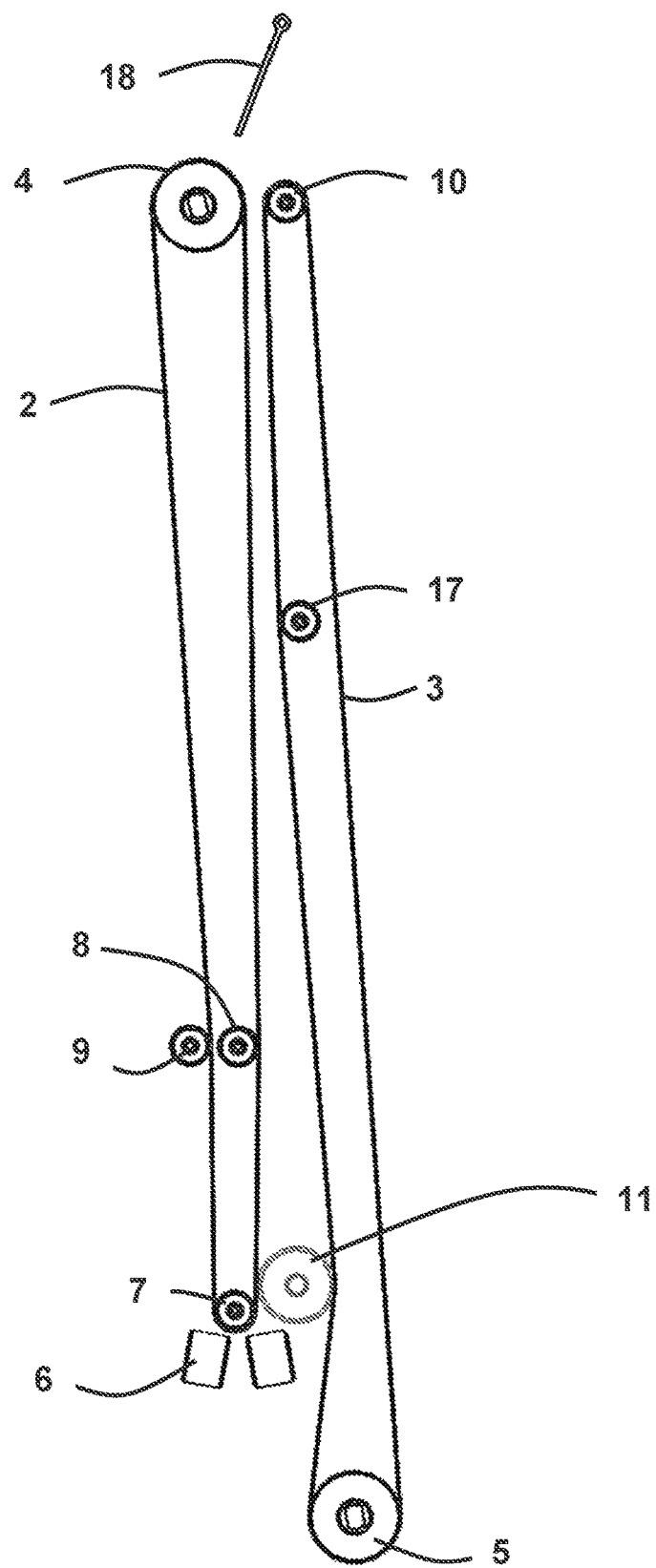
FIG. 9 is a front view of the primary embodiment of a transport device with additional exit guiding means, in a fifth operational state.

FIG. 9 is a front view of the primary embodiment of a transport device with additional exit guiding means, in a fifth operational state.

The exit guiding means corresponds to those described above with reference to FIG. 8. In the illustrated, fifth operational state, the second support roller 7 is in position "in", i.e., another object 11 has been selected for sorting into the conveyor device 13 and the object supporting device 12. Otherwise the position and state of the various elements of the transport device 1 correspond to their position and state in the first operational state.

Figure 10:
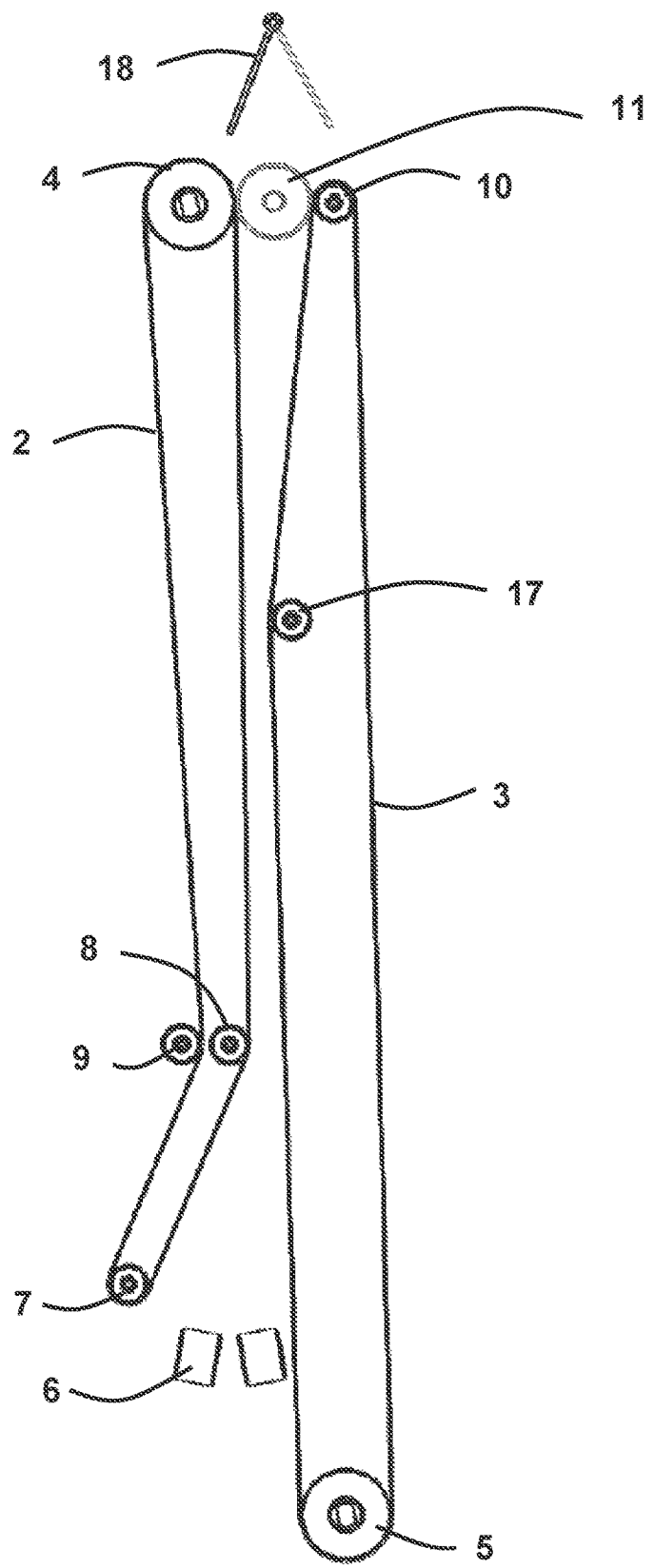
FIG. 10 is a front view of the primary embodiment of a transport device with additional exit guiding means, in a sixth operational state.

FIG. 10 is a front view of the primary embodiment of a transport device with additional exit guiding means, in a sixth operational state.

The exit guiding means corresponds to those described above with reference to FIGS. 8 and 9. In the illustrated, sixth operational state, the second support roller 7 is in position "out". An object 11 which is exiting the conveyor device 13 and the object supporting device 12 is actively guided in a selected direction by the top sorter flap 18.

When the object 11 is exiting at the top of the conveyor device 13 and the object supporting device 12, it may have a high speed due to the speed of the belts and the release of the clamping force between the belts. To ensure that the objects do not go astray it is advantageous to provide guiding surfaces to steer the object in the intended direction. A guiding surface can also be on the top as a ceiling. When the object leaves the conveyor device 13 and the object supporting device 12, at high speed, they will hit the ceiling or guiding surface and be steered further to a transport, processing or storage device.

This guiding surface can also be an active sorting unit, wherein the top sorter flap 18 guides the objects exiting the conveyor device 13 and the object supporting device 12 in two or more directions depending of the angle of top sorter flap 18. Other mechanical devices can achieve the same sorting and guiding action.

This enables more objects to move in on the translational conveyor 6. At the top of the lifting conveyor belts 3 and 2, the objects will have substantial speed. From here the objects 11 can be guided further to a transport, processing or storage device (not illustrated). The transport device can be a conveyor, sloped surface or other horizontal or vertical transport device. The processing device can be a crushing device, compacting device or other device. The storage device can for instance be a pallet, wire frame container, plastic bag, cardboard box, dolly pallet or other type of storage container.

Although the top sorter flap 18 has been illustrated in combination with a conveyor belt-based object supporting device 12 in FIGS. 8, 9 and 10, it should be understood that a sorter flap 18 may likewise be used in the case of a clamping member-based object supporting device 12 (e.g. of the type shown in FIG. 7).

Figure 11:
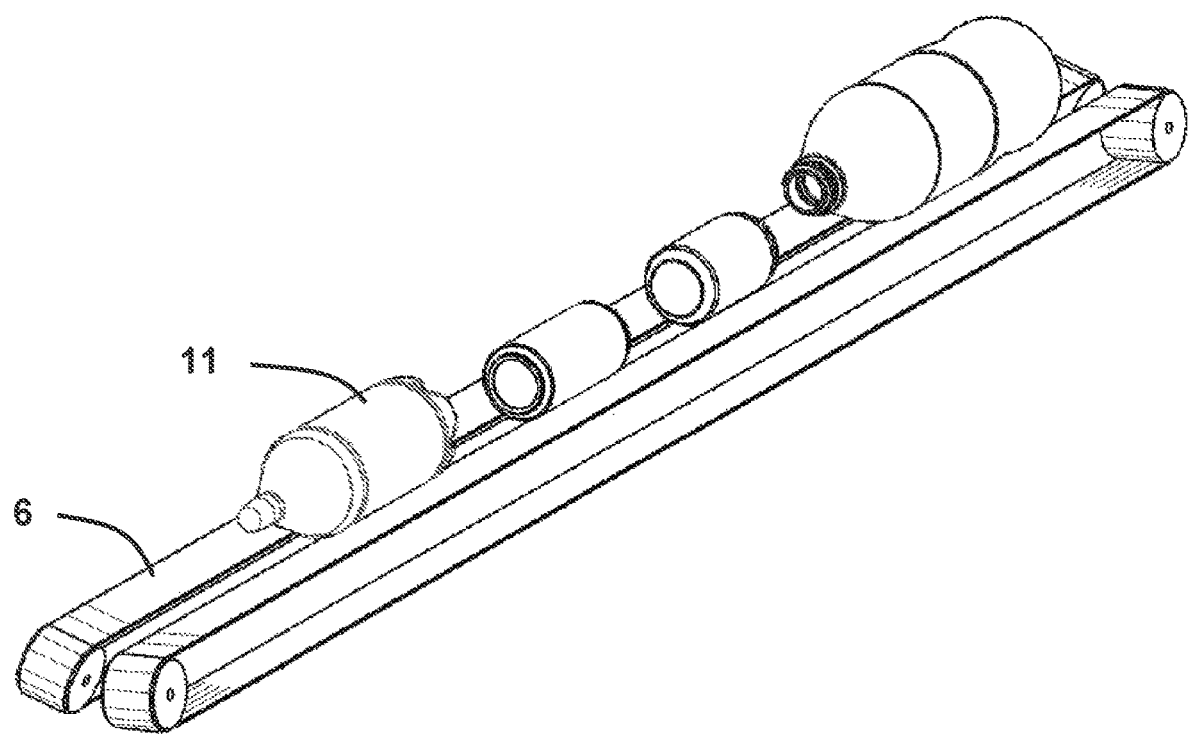
FIG. 11 is a perspective view of a translational conveyor.

FIG. 11 is a perspective view of a translational conveyor.

The translational conveyor 6 has been described above with reference to FIG. 1. Further possible features and aspects of the translational conveyor has been disclosed in the following.

As illustrated in FIG. 11, objects 11 of various types, shapes and sizes may be conveyed forward on the translational conveyor 6. The objects 11 are typically arranged in one row on the translational conveyor 6. The distance between the objects may be variable and this depends on who or what is feeding the translational conveyor 6. The variation in shape and size of the objects may also cause variable distance.

The translational conveyor 6 can rest on a plate, or another underlying structure, which can advantageously be located at a certain height, typically 900-1400 mm above a floor level. This is the natural height for a person to feed objects onto the translational conveyor 6.

The translational conveyor 6 may include one or more belts that transport the objects. In the illustrated embodiment the translational conveyor 6 consists of two conveyor belts, each 45 mm wide and having a thickness of 2 mm. The belts are positioned in a V-shape, with a 160° angle and at a transversal distance of 25 mm between them. This is a geometry optimized to transport beverage containers like bottles and cans, but the size and geometry of the translational conveyor 6 may vary according to the circumstances.

The disclosed transport device 1 will even be operable without a translational conveyor 6. Alternatively, the translational conveyor 6 may just be a flat surface where the conveyor device 13 and the object supporting device 12 can clamp the objects to sort and transport the objects to a higher-level position.

The translational conveyor can be V-shaped, but it can also be arranged in other ways. The belts itself can be round, flat or having other geometries including flat belts with side supports or other elements attached to a flat belt.

The translational conveyor is predominantly horizontal but can be positioned in any suitable descending or ascending angle.

It can also be possible to do the sorting of selected objects by moving the translational conveyor 6 instead of moving the second support roller 7 or the clamping member 16. By lifting or moving the translational conveyor 6 towards the lower end of the object supporting device 12, conveyor device 13 and the object supporting device 12 will force the object to be transported up between the conveyor device 13 and the object supporting device 12. The translational conveyor 6 can then be lowered or moved back down to its former position to allow the next object to either continue along the translational conveyor 6 or be selected for sorting when the next object is in the correct position.

The invention claimed is:

1. A transport device for lifting an object in a reverse vending machine, the transport device comprising:
   a conveyor device for lifting the object from a lower level position to a higher level position in the reverse vending machine,
   an object supporting device arranged substantially parallel to the conveyor device, and
   an actuating device arranged to move the object supporting device in such a way that a spacing between the conveyor device and the object supporting device is reduced as to allow the object to be held between the conveyor device and the object supporting device during the lifting of the object.

2. Transport device according to claim 1,
   wherein the conveyor device includes a first, endless conveyor belt arranged about a first drive roller and a first support roller.

3. The transport device according to claim 2,
   wherein the first drive roller and the first support roller are rotatable around fixed axes.

4. The transport device according to claim 2,
   wherein the first drive roller includes a motor, arranged to rotate the first drive roller in such a direction that the first conveyor belt forces the object to be lifted.

5. The transport device according to claim 2,
   wherein the first conveyor belt is elastic in a longitudinal direction of the first conveyor belt.

6. The transport device according to claim 2,
   wherein the object supporting device includes a second, endless conveyor belt arranged about a second drive roller and a second support roller, the object being held between the first conveyor belt and the second conveyor belt during the lifting of the object.

7. The transport device according to claim 6,
   wherein the second drive roller includes a motor, arranged to rotate the second drive roller in such a direction that the second conveyor belt forces the object to be lifted.

8. The transport device according to claim 6,
   wherein the second conveyor belt is elastic in a longitudinal direction of the first conveyor belt.

9. The transport device according claim 6,
   wherein the object supporting device further includes an intermediate support roller, the second drive roller and the intermediate support roller being rotatable around fixed axes, and the second support roller being rotatable about a moveable axis.

10. The transport device according to claim 9, wherein the actuating device is arranged to move the moveable axis of the second support roller in such a way that a spacing between first conveyor belt and the second conveyor belt will be reduced until an object selected to be lifted comes in contact with the first and the second conveyor belts, is clamped between them and transported upwards.

11. The transport device according to claim 2, wherein the object supporting device includes a clamping member having a surface, the object being clamped between the conveyor device and the surface of the clamping member during the lifting of the object.

12. The transport device according to claim 11, wherein the actuating device is arranged to move the clamping member in such a way that a spacing between first conveyor belt and the surface of the clamping member will be reduced until an object selected to be lifted comes in contact with the first conveyor belt and the clamping member, is clamped between them and transported upwards.

13. The transport device according to claim 12, wherein the translational conveyor is arranged to be lifted or moved towards the entry location of the conveyor device and the object supporting device, allowing the object to be inserted between the conveyor device and the object supporting device and transported upward.

14. The transport device according to claim 1, further comprising a top sorter flap which is arranged to guide an object exiting the conveyor device and the object supporting device in one of a plurality of directions.

15. The transport device according to claim 1, further comprising a translational conveyor, configured to transport the object in a substantially horizontal direction to an entry location between or underneath the conveyor device and the object supporting device.

16. A reverse vending machine, comprising a transport device for lifting an object in the reverse vending machine, the transport device comprising:
   a conveyor device for lifting the object from a lower level position to a higher level position in the reverse vending machine, and
   an object supporting device arranged substantially parallel to the conveyor device and arranged in such a way as to allow the object to be held between the conveyor device and the object supporting device during the lifting of the object.

* * * * *